(12) United States Patent
Piry et al.

(10) Patent No.: US 7,823,019 B2
(45) Date of Patent: Oct. 26, 2010

(54) DEBUG CIRCUITRY

(75) Inventors: Frederic Claude Marie Piry, Cagnes-sur-Mer (FR); Lionel Edouar Arthur Ostric, Golfe Juan (FR); Edmond John Simon Ashfield, Cambridge (GB)

(73) Assignee: ARM Limited, Cambridge (GB)

( * ) Notice: Subject to any disclaimer, the term of this patent is extended or adjusted under 35 U.S.C. 154(b) by 355 days.

(21) Appl. No.: 12/149,851

(22) Filed: May 8, 2008

(65) Prior Publication Data
US 2009/0282304 A1 Nov. 12, 2009

(51) Int. Cl.
G06F 11/00 (2006.01)
(52) U.S. Cl. ........................................ 714/35
(58) Field of Classification Search .................... 714/35
See application file for complete search history.

(56) References Cited
U.S. PATENT DOCUMENTS

| | | | |
|---|---|---|---|
| 5,594,904 A * | 1/1997 | Linnermark et al. ........ 717/124 |
| 5,815,653 A * | 9/1998 | You et al. ...................... 714/38 |
| 6,158,045 A * | 12/2000 | You ............................ 717/124 |
| 6,553,513 B1 * | 4/2003 | Swoboda et al. .............. 714/28 |
| 6,681,384 B1 * | 1/2004 | Bates et al. .................. 717/129 |
| 7,574,567 B2 * | 8/2009 | Wyman ...................... 711/141 |
| 2003/0084375 A1 * | 5/2003 | Moore et al. .................. 714/34 |
| 2004/0170046 A1 * | 9/2004 | Belnet et al. ................. 365/145 |
| 2007/0079177 A1 * | 4/2007 | Spirakis et al. ............... 714/34 |
| 2008/0256339 A1 * | 10/2008 | Xu et al. ...................... 712/216 |
| 2009/0070534 A1 * | 3/2009 | Yu et al. ...................... 711/146 |
| 2009/0094419 A1 * | 4/2009 | Sarkar et al. ................. 711/152 |
| 2009/0235262 A1 * | 9/2009 | Ceze et al. ................... 718/102 |
| 2009/0320001 A1 * | 12/2009 | Bates et al. ................. 717/129 |

* cited by examiner

Primary Examiner—Bryce P Bonzo
(74) Attorney, Agent, or Firm—Nixon & Vanderhye P.C.

(57) ABSTRACT

An apparatus for processing data includes diagnostic mechanisms for providing watch point and breakpoint functionality. Semaphores are associated with the watch points and are provided with hardware support within the diagnostic circuitry serving to monitor whether or not accesses to watch point data is being made in accordance with the permissions set up and noted in the semaphore data.

15 Claims, 9 Drawing Sheets

DEBUG CIRCUITRY

BACKGROUND OF THE INVENTION

1. Field of the Invention

The present invention relates to the field of debug circuitry in a data processing apparatus. More particularly, the invention relates to the control of watch point units within debug circuitry.

2. Description of the Prior Art

A known programming model consists in associating a set of data with a semaphore. The state of the set of data, and derived from this the usage that can be made of this set of data, is derived from the state of the semaphore. For example, when multiple tasks must be performed on a set of data, the semaphore may reflect which of these tasks have already been performed, and which have not yet been performed.

In the context of software threads, the concept of the semaphore may be further extended to include information that a thread currently "owns" the data set. Owning a data set provides a given set of rights, while not owning it provides another set of rights. For example, a thread producing data for another thread will take the ownership of the semaphore. This ownership gives it rights to write the set of data. When taking the ownership of the semaphore, the thread should also set the state of said semaphore to reflect the fact that the set of data is being produced, hence indicating to other threads that the set of data is not available. When the thread producing the set of data completes its task, it both releases the ownership of the semaphore and changes its state to reflect the fact that the data is available to the other threads. The other threads will read this set of data to complete their own task.

Enforcing this programmer's model is not an easy task. It is known, during the development of such software applications, to face what are called data corruption problems. Corruption may have multiple sources. For example, one known problem is when a thread consuming some data produced by another thread starts reading this data before the producer has effectively produced it, or some part of it.

Another known data corruption problem occurs when multiple threads, having to work on the same set of data, work concurrently instead of sequentially on this set of data, modifying this data at the same time, one overwriting the data produced by the other thread.

Hardware support for debugging such software applications, and tracking such errors, mainly resides in three components: breakpoints, watch points and trace. It is known to use watch points to trap accesses to a given set of data (one or more data values). To debug a data corruption problem, a watch point is set to the set of data. This watch point can be set to track only some kinds of accesses so as to limit the number of false triggers. The watch point unit is then programmed to not report allowed accesses, or in a way that it filters most of the allowed accesses. Multiple conditions may be set. Such conditions may include the nature of the access. An identity field may also be provided, indicating the thread to which these conditions apply, or to which the conditions do not apply.

It is known to instrument the software routines used to access semaphores, so that they update the condition used by the watch point unit according to the new state of the semaphore, or further with the identity of the thread owning the semaphore, if any.

The cost of the instrumentation of these routines is a major drawback of such known techniques. It may require modification to the Operating Systems, and this modification may not necessarily be accepted by the vendor of the Operating System. It also requires modification to be made to the applications sharing the set of data, so that they all update the information associated with the watch point unit. This may require a significant amount of work as the procedure call for such instrumented routines may differ from the standard one used when the application is not being debugged. In some cases, it may even not be feasible, when the source code of a given application is not available, for example when this application is provided by a third party.

When these multiple threads run on multiple processors, as is the case on Symmetric Multi-Processing systems (SMP) for example, the watch point units associated with each of the multiple processors must be synchronised to track the same data set with the same set of conditions. This is a further drawback of the prior art, as synchronising the watch point units on each processor requires further modifications to the Operating System, and introduces a serialisation point in the program flows. This serialisation may impact the visibility of the bug, making it less likely to occur, hence less likely to be found. In some cases, this serialisation fully removes the occurrence of the bug, which then cannot be tracked using this technique.

A known way of implementing these instrumented routines over an SMP system is described hereafter, in a simplistic scheme.

When software thread takes the ownership of a semaphore, the routine dealing with taking that ownership subsequently performs the following actions, prior to returning ownership to the calling thread:

Get the identification of the thread currently running.

Update the local watch point unit, so that, for accesses made by this thread, it uses a given set of conditions, and for accesses made by other threads, it uses a further set of conditions. This is done through a call to the Operating System.

Update the watch point units located in the other processors of the cluster of processors accordingly. This is done by another call to the operating system, which in turn must broadcast a message to the other processors, forcing them to enter a privileged mode and calling the Operating System locally.

This also requires that any thread dealing with the memory location being watched at is instrumented in this way.

It should be noted that in this description, the term semaphore should be understood in its widest sense, describing any mechanism used for asserting the state of a set of data, or assisting in the use of a shared set of data, and as such, for example, mutex, locks, spinlocks and equivalent software objects are all considered as forms of semaphore.

It should also be noted that while the description uses the terms "software threads" or "software applications", it is not restricted to threads or applications as sometimes considered in strict Operating Systems wording, but should instead be understood as any set of instruction sequences able to share a set of data with another set of instruction sequences. As such, a non exhaustive list of what the present invention covers includes programs running on top of an Operating Systems, multiple Operating Systems, multiple parts of the same program or of the same Operating System, multiple threads of the same application and multiple instances of the same process or program.

SUMMARY OF THE INVENTION

Viewed from one aspect, the present invention provides apparatus for processing data comprising:

data watch point circuitry responsive to a sequence of data access requests made to watched data to determine for a request of said sequence of requests whether said request correlates with at least one watch point condition and, if said request does correlate with at least one watch point condition, to trigger a match response; and watch point updating circuitry responsive to a write access to an access-control data item stored in a memory to determine whether said write access is indicative of a need to change said at least one watch point condition and, if said write access is indicative of a need to change said at least one watch point condition, to overwrite said at least one watch point condition with a modified set of at least one watch point condition.

The watch point updating circuitry provides a semaphore-aware watch point for tracking accesses made by said processor to a semaphore protecting the watched memory region. If such an access is made, the semaphore aware watch point overwrites a current set of conditions of the watch point unit with a second set of conditions. At least preferred embodiments of the present technique allow a dynamic application of conditions to a watch point unit.

In some embodiments the semaphore aware watch point further tracks the value written by the processor. The semaphore-aware watch point can use this value to select from a plurality of sets of condition(s), and uses this selected set of condition(s) to overwrite the current watch point unit set of condition(s).

For example, if the semaphore is written with a value of zero, the semaphore-aware watch point unit may overwrite the set of conditions of the watch point unit with further conditions, so that the watch point unit reports any read access made to the memory region protected by the semaphore; while if the semaphore is written with a non-zero value, it may overwrite the set of condition of the watch point unit with another set of conditions, so that the watch point unit reports any write access made to the same memory region.

It will be appreciated that while a common usage for this semaphore only uses two values, the current techniques envisage the case where more than two values are used to control the memory region.

In other embodiments, the current technique tracks identification data provided by the processor, the identification data identifying the thread running on the processor. When this thread takes ownership of the semaphore by writing to it, the semaphore-aware watch point further registers the identification data. The semaphore-aware watch point can subsequently overwrites the set of conditions of the data watch point circuitry with a first set of conditions, whenever the identification field provided by the processor matches the identification field stored within the semaphore-aware watch point, and with a second set for any different identification field.

It will be noted that this scheme can be extended further, with more than one instance of identification data being stored within the semaphore-aware watch point.

In another embodiment, the processor is one in a plurality of processors. Whenever a semaphore-aware watch point on any of the processors tracks a write access to a watched semaphore, it reports this information to the other semaphore-aware watch points of the other processors, these other semaphore aware watch point updating their state to reflect the effect of this write, overwriting the set of condition of the watch point unit with the appropriate set of conditions.

In another embodiment, the processor is one in a plurality of processors. In this embodiment, the semaphore-aware watch point further tracks an identification field provided by the processor, said identification field providing a way to identify the thread running on any processor. When this thread takes ownership of the semaphore by writing to it, the semaphore-aware watch point further registers the identification field, and further provides this information to the other semaphore-aware watch points. Each semaphore-aware watch point subsequently overwrites the set of conditions of the local watch point unit with a first set of conditions, whenever the identification field provided by the processor it is attached to matches the identification field stored within the semaphore-aware watch point, and with a second set for any different identification field.

It will be understood that while the above assumes a mechanism where a given software thread has the same identification data when running on any of the processors, the present techniques can also be used in cases where this identification data differs depending on which processor the software thread is run on, and the watch point updating circulating translates stored identification data as required for each semaphore-aware watch point.

The above, and other objects, features and advantages of this invention will be apparent from the following detailed description of illustrative embodiments which is to be read in connection with the accompanying drawings.

BRIEF DESCRIPTION OF THE DRAWINGS

FIG. 2B1 is a diagram showing a simple example of how two watch point unit can be connected together by an inter watch point bus;

DESCRIPTION OF THE PREFERRED EMBODIMENTS

Figure 1:
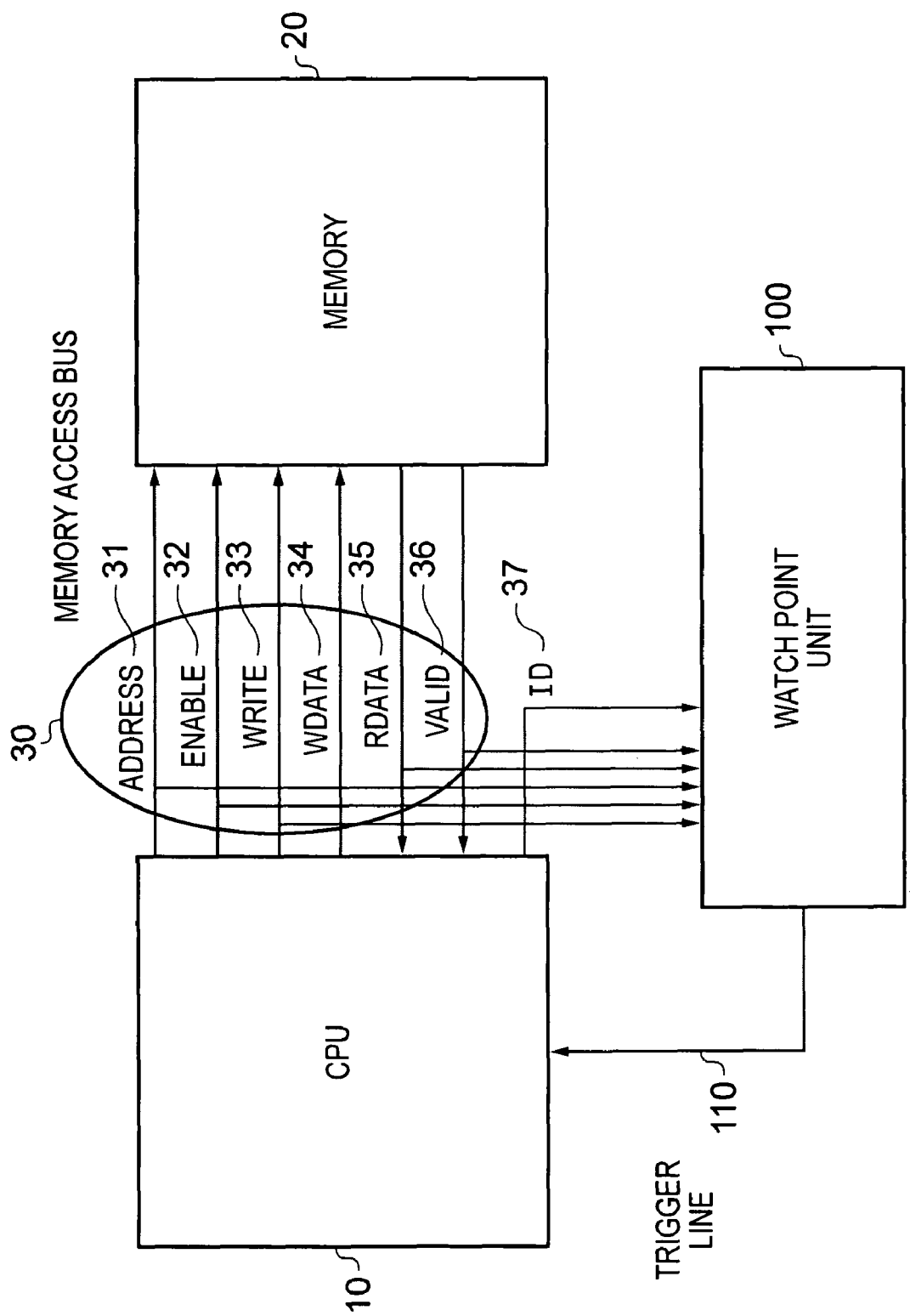
FIG. 1 is a diagram schematically illustrating a processing system in which a watch point unit is employed.

FIG. 1 illustrates a processing device 10 accessing a memory 20 for data read or writes, using a memory access bus 30. A watch point unit (circuitry) 100 is used to track accesses from the processing device 10 to memory 20. A trigger line 110 is operated by the watch point unit 100 whenever a request from processing device 10 to data memory 20 correlates with one of previously set conditions located in watch point unit 100, to force the processing device 10 to enter a debug mode.

The memory access bus 30 is composed of multiple signals. Though a simple embodiment is described here, one skilled in the art will understand that the present invention is not limited to memory accesses using this simple scheme, but also covers any memory access bus using any memory access protocol. ADDRESS bus 31 is provided, used for both read and write accesses, providing the address targeted by the data transfer requested by the processing device 10. An ENABLE line 32 is asserted whenever the data transfer request is valid. A WRITE line 33 is asserted by the processing device 10 whenever said data transfer is a write request. If the WRITE line 33 is not asserted when a valid data transfer is initiated using the ENABLE line 32, then the access request is a read request. If the access request is a write request, then the processing device 10 uses the WDATA 34 bus to provide the data value to be written to the memory location to the memory 20. In case of a read request, the memory 20 asserts the VALID line 36 to indicate to the processing device 10 that the data provided by the RDATA bus 35 is valid, and should be latched by said processing device 10.

An ID bus 37 provides identification data of the process currently been executed on the processing device. Though a simple scheme for the present invention will not require such information, one skilled in the art will understand that in advanced debugging, the identification of the software process accessing the memory is useful information to track within the watch point unit 100.

The watch point unit 100 monitors the memory access bus 30, and interprets each data transfers. Each data transfer is compared to a given set of conditions, stored in the watch point unit 100. If there is a correlation (e.g. a match) between a data transfer and one of the conditions stored in the watch point unit 100, the trigger line 110 is operated so as indicate that the condition was met. The processing device 10 responds to the trigger line 110 by entering a dedicated debug mode. One skilled in the art will appreciate that when the trigger signal is asserted, multiple scenarios can occur, depending on the configuration of the processing device. One scenario may be that the processor executes a given program known as debug monitor code. Another scenario may force the processing device to halt while indicating to an external debugger that halt mode has been entered, as the result of a condition set by this debugger being met.

Though the present description only refers to the case of triggering a condition based on a single data transfer, one skilled in the art will understand that the present technique may be used in the case where the triggering condition is based on a sequence of conditions triggered by multiple memory transfers.

Figure 2A:
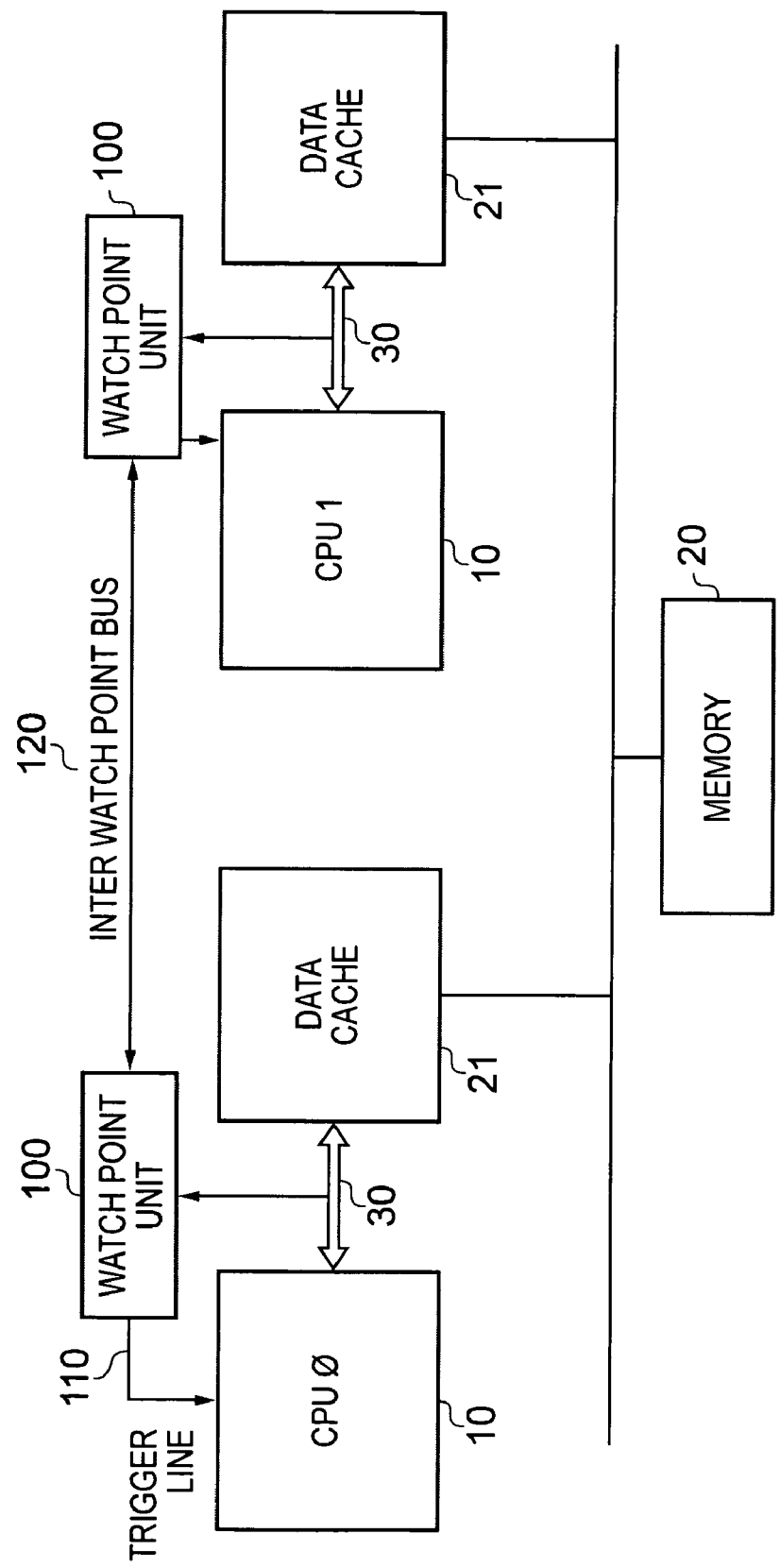
FIG. 2A is a diagram which illustrates a processing system where multiple processing devices are working in a Symmetric Multi-Processing manner.

FIG. 2A illustrates multiple processing devices 10 working with a memory 20, where some part of the memory 20 contains data shared by both processing devices 10.

Two watch point units 100 are connected together by an inter watch point unit bus 120. A simple example of such an interconnect bus is described in FIG. 2B.

In FIG. 2A, the processing devices 10 are not directly connected to the memory. They are instead connected to a private level one data cache 21. One skilled in the -art will understand that the memory access bus 30 depicted on FIG. 1 may be, in its use, identical to the one depicted on FIG. 2A. Each watch point unit 100 is hence connected to that memory access bus 30.

Figure 2B:
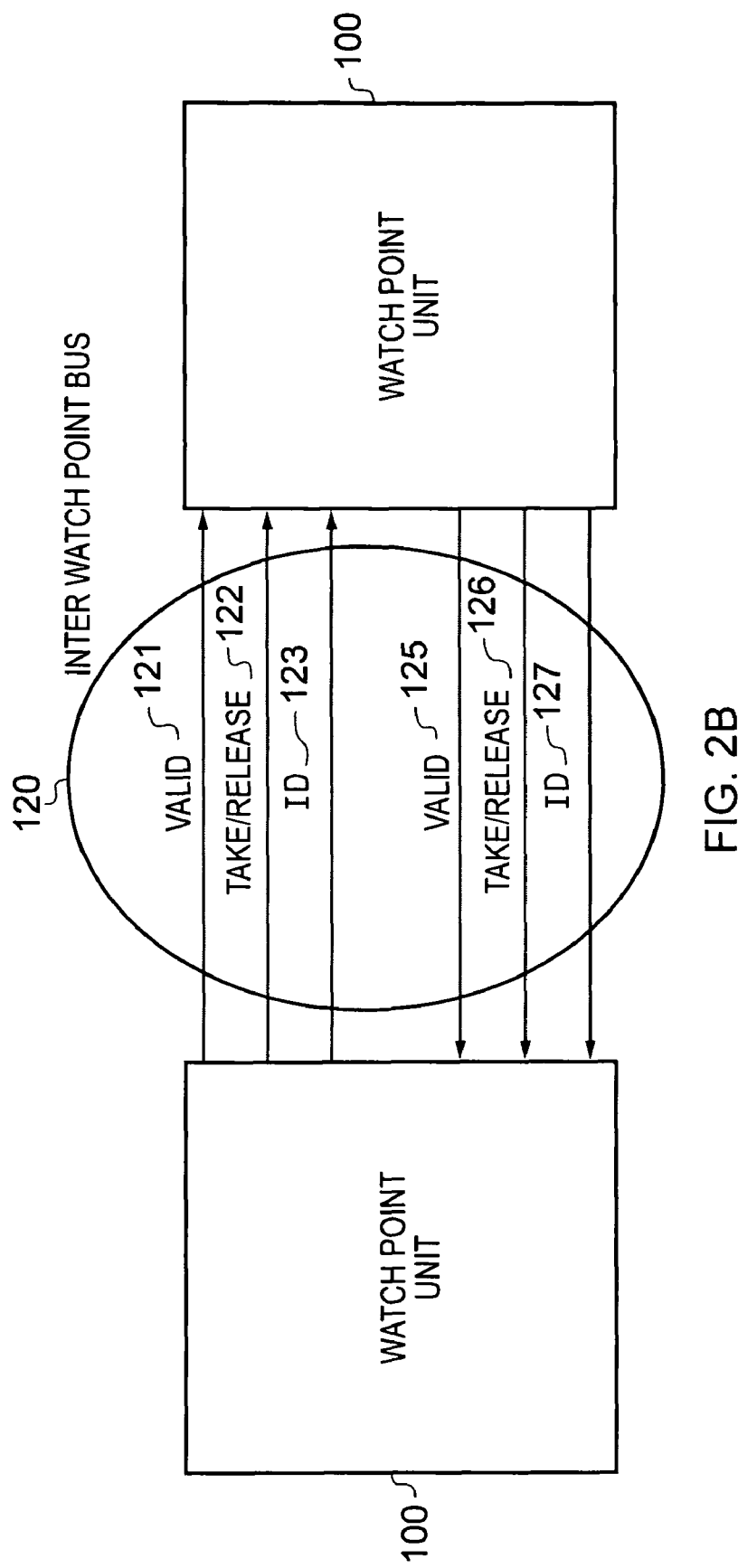

FIG. 2B illustrates a simple example of an inter watch point unit bus 120. In this example, the inter watch point unit bus 120 is composed of two identical busses, one output bus being used to inform another watch point unit 100 that an update of the semaphore state is required, and one input bus being used to get informed that an update to the state of the semaphore is required. Each sub-bus is composed of three lines. The VALID lines 121 and 125 are used to indicate that a transfer is required. The TAKE/RELEASE lines 122 and 126 are used to indicate the new state of the semaphore. The ID lines 123 and 127 are used to indicate the identification of the process that is currently owner of the semaphore, if the respective TAKE/REALESE lines 122 and 126 indicates that the current update of the state of the semaphore is a transition from RELEASED to TAKEN. In a simpler scheme, this line could be omitted.

One skilled in the art will understand that the depicted scheme is simple one. More advanced communication scheme are envisaged and embody the present technique(s). For example, while a point-to-point communication bus is described, a broadcasting interconnect used to connect more than two watch point unit together could be used.

Figure 3A:
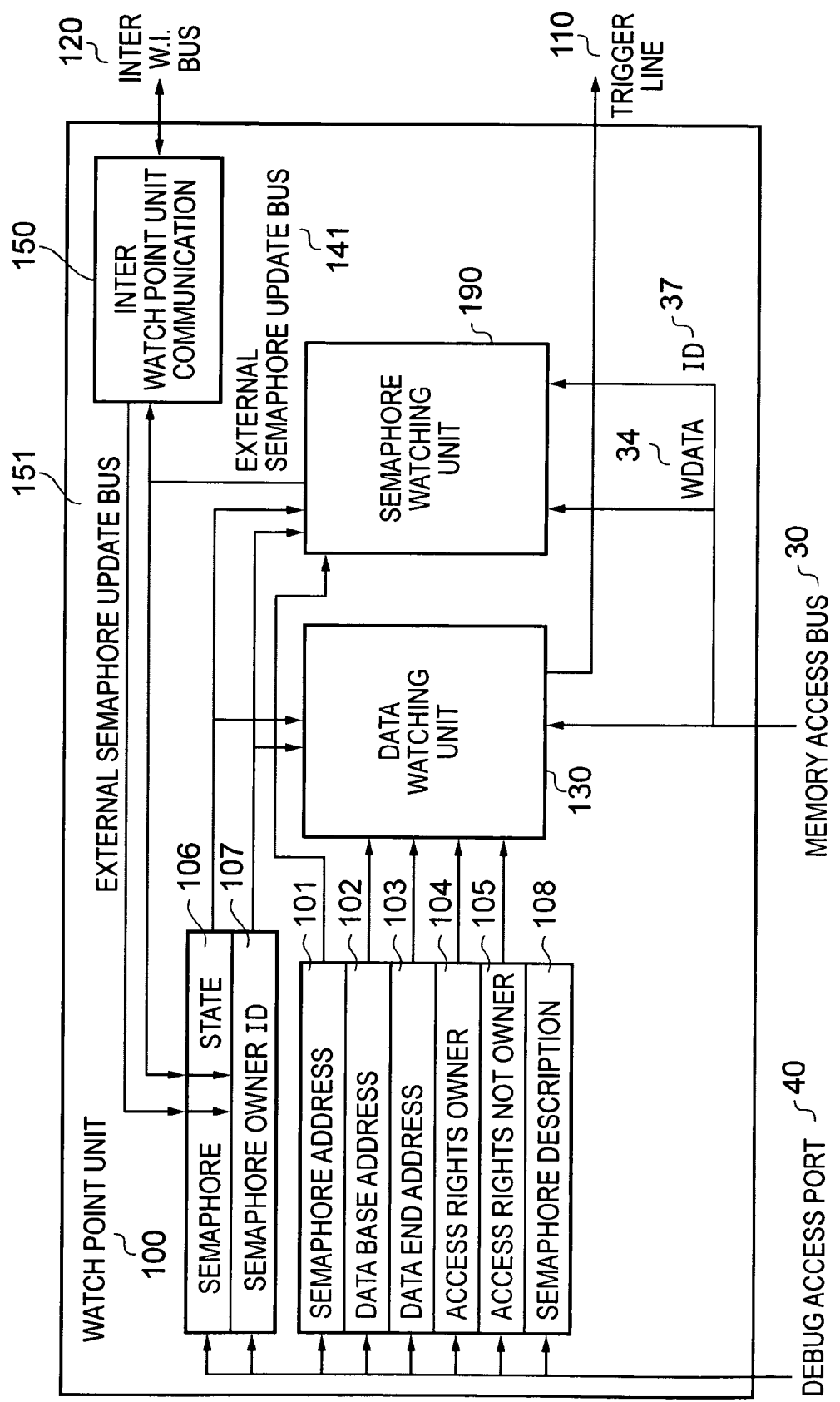
FIG. 3A is a block diagram schematically illustrating in more details the arrangement of a Watch point unit in accordance with preferred embodiments of the present invention.

FIG. 3A illustrates in more detail an embodiment of an example watch point unit 100. The watch point unit 100 is able to store data internally. In the present description, this data is stored in registers as follows:

SEMAPHORE ADDRESS 101 is used to store the address of the semaphore.

DATA BASE ADDRESS 102 is used to indicate the starting point of the memory region covered by the watch point unit, and associated with the semaphore lying at address SEMAPHORE ADDRESS 101;

DATA END ADDRESS 103 is used to indicate the end address of the memory region covered by the watch point unit, and associated with the semaphore lying at address SEMAPHORE ADDRESS 101, one skilled in the art will understand that although a base address and an end address are provided in the present example, the technique could be used in other embodiments where the data region is described in other ways, such as a base address and size information;

ACCESS RIGHTS OWNER 104 is used to store the access rights allowed for an access made by the owner of the semaphore;

ACCESS RIGHTS NOT OWNER 105 is used to store the access rights allowed for an access made by someone not owning the semaphore;

SEMAPHORE STATE 106 is used to store the current state of the semaphore, in the present example embodiment, this is a two-phase state, TAKEN and RELEASED;

SEMAPHORE OWNER ID 107 is used to store identification data for the process currently owning the semaphore, if any;

(SEMAPHORE STATE 106 and SEMAPHORE OWNER ID 07 can be written by a semaphore watching unit 140 through an internal semaphore update bus 141, or by a inter watch point unit communication 150 through the external semaphore update bus 151, upon reception of a request for changing the state of the semaphore from an external watch point controller.).

SEMAPHORE DESCRIPTION 108 is used to describe the different values the semaphore can take, and their associated meaning. In this example embodiment, a "0" in this register indicates that the semaphore is in the TAKEN state when it is written with the value 0, and RELEASED when it is written with any other value. One skilled in the art will appreciate that other scenarios can be used to describe the semaphore, and the technique is not limited by this example embodiment.

Debug access port 40 is used to access these registers 101-108. Accesses through this port 40 are initiated either by a debugger or by the processing device itself, depending on the debug strategy used to debug the processing device. One skilled in the art will understand that other scenarios can be applied, like accessing this registers 101-108 via a scan chain or a dedicated read/write interface; these other scenario are also embodiments of the present technique(s).

Though access via the debug access port 40 to registers SEMAPHORE STATE 106 and SEMAPHORE OWNER ID 107 is not mandatory, one skilled in the art will understand that accesses to these registers can be useful for both setting up purposes and for getting a better understanding of the reasons why the trigger line has been asserted.

Figure 4:
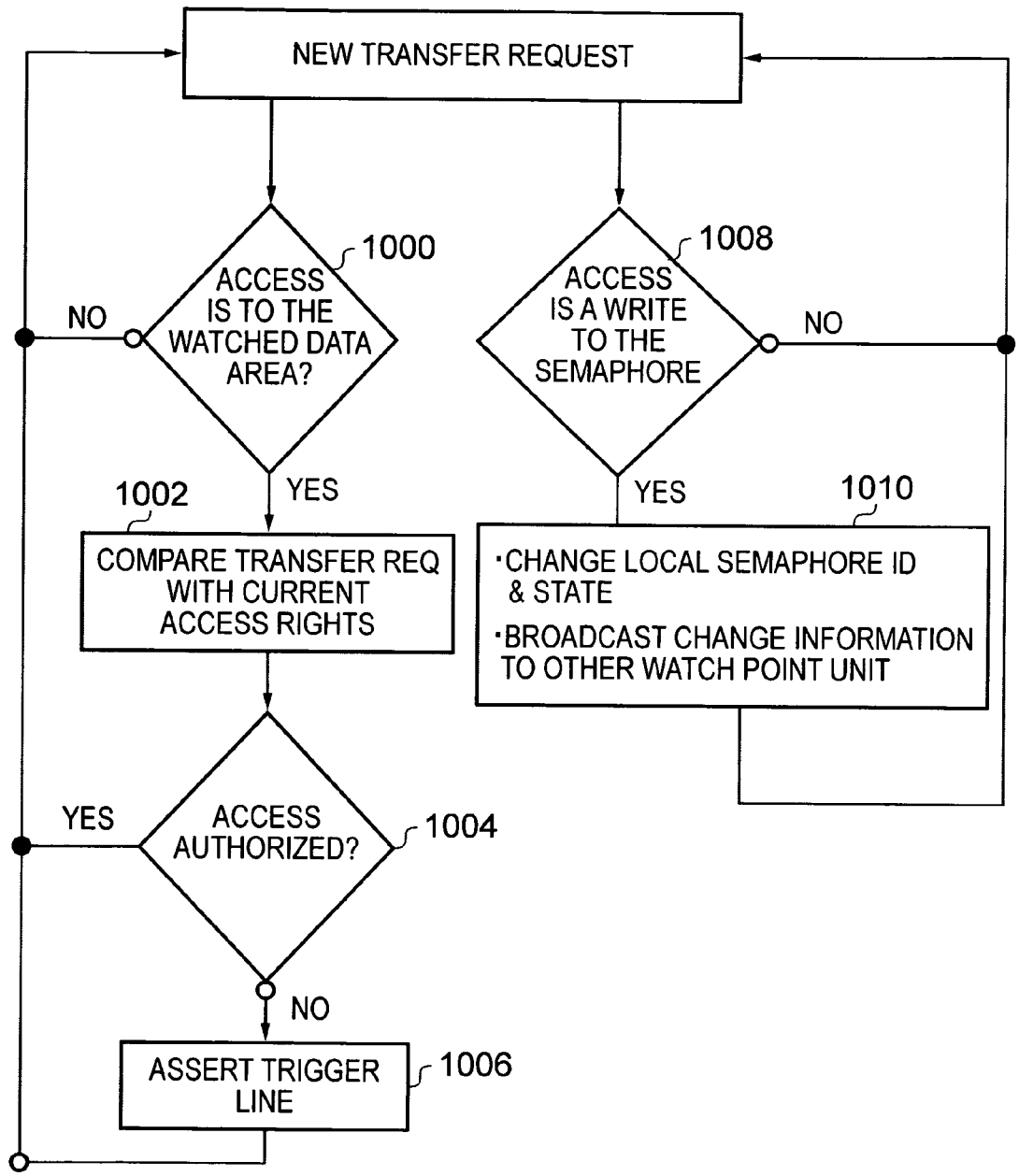
FIG. 4 is a flowchart describing the steps to be done upon detecting a new transfer request by the processing device.

Data watching unit 130 is further explained in FIG. 3A and in FIG. 4. The data watching unit 130 compares a current access, as reflected by the memory access bus 30, with the current access rights policy. In case of a prohibited access to the data region covered by the watch point unit 100, and described by registers data base address 102 and data end address 103, the data watching unit 130 asserts the trigger line 110, used to inform the system that an un-authorized access has just been made. This trigger line 110 is usually connected to the processing device in which the access has been generated, to force it to enter a programmed debug mode.

Semaphore watching unit 140 (part of the watch point updating circuitry) is in charge of tracking accesses made by the processing unit to the semaphore. A write to the semaphore, reflected by the memory access bus 30, induces a change in the state of this semaphore. This change is reflected by the semaphore watching unit on the internal semaphore update bus 141. When a change of the state of the semaphore is needed, the semaphore watching unit 140 uses information from the memory access bus 30, such as WDATA 34 and ID 37, and provides this information on the internal semaphore update bus 141.

The internal semaphore update bus 141 is connected to both the inter watch point communication unit 150 and to the registers SEMAPHORE STATE 106 and SEMAPHORE OWNER ID 107. On reception of a change request from the semaphore watching unit 140, registers SEMAPHORE STATE 106 and SEMAPHORE OWNER ID 107 gets updated according to the information provided by the internal semaphore update bus.

On reception of a change request from the semaphore watching unit 140, the inter watch point communication unit 150 uses the inter watch point bus 120 to inform other watch point unit that a change of the state of the semaphore is required. A simple example of how the inter watch point bus 120 can be used to indicate a change of the state of the semaphore is described in FIG. 2B.

Figure 3B:
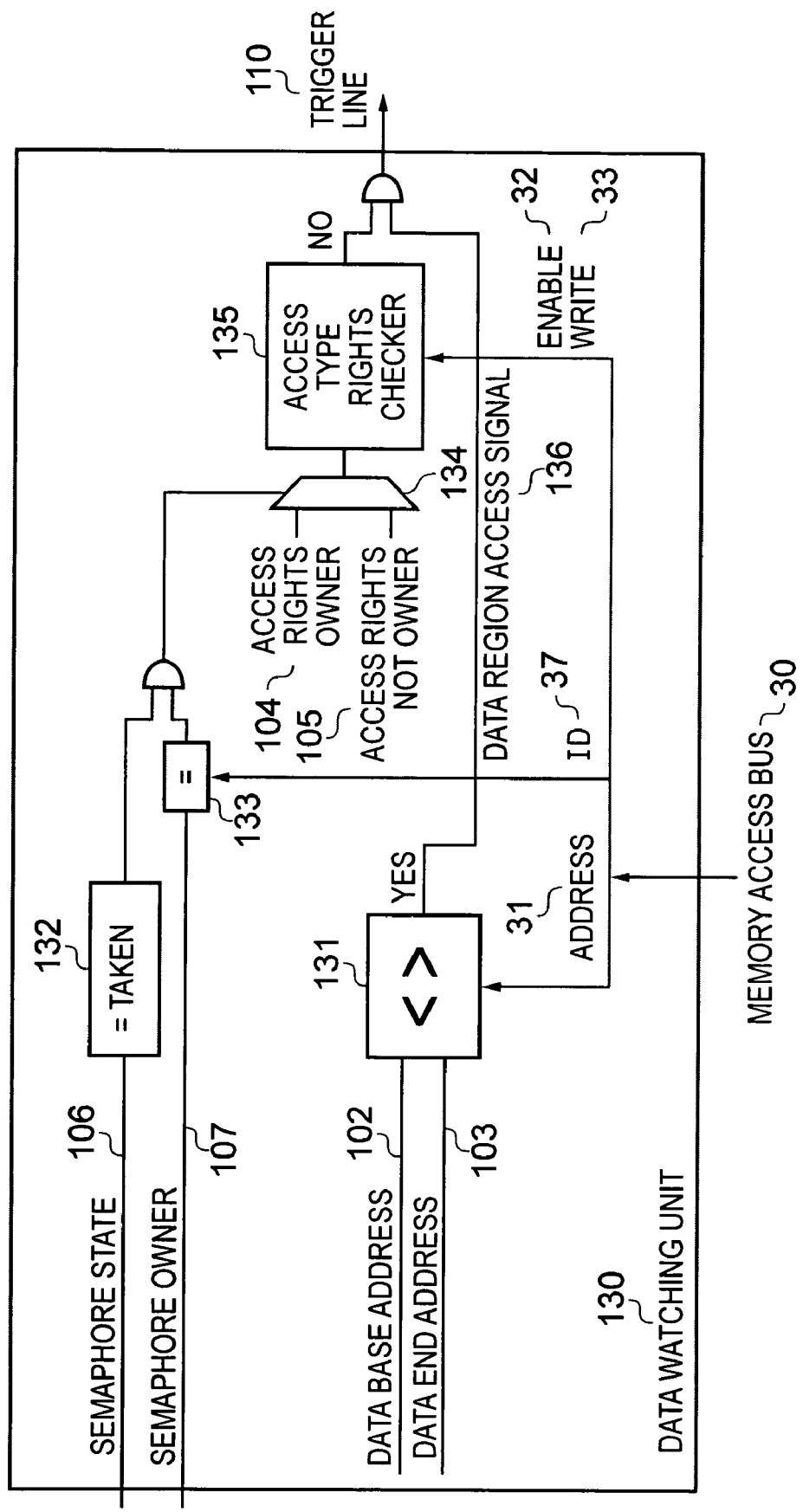
FIG. 3B is a block diagram of a data watching unit, used to track if an access made by a processing device conforms to the current access rights policy.

FIG. 3B describes internal functionality of the data watching unit 130 as disclosed in FIG. 3A. Data base address 102 and data end address 103 values are used to determine whether the current access targets the memory region being watched upon by the watch point unit. The value on address bus 31, provided by the memory access bus 30, is compared with data base address 102 and data end address 103, and, if it is included in the defined region, then the data region accessed signal 136 is asserted. Semaphore state 106 and semaphore owner ID 107 are used, together with ID 37 from the memory access bus 30, to determine in block 134 which access rights policy is to be enforced. One skilled in the art will notice that while the present embodiment chooses to select among two access rights (namely access rights owner 104 and access rights not owner 105) internally to the data watching unit 130, other embodiments could externally determine which rights need to be enforced externally, either dynamically on each access or statically on a context identification basis (the present techniques can use either approach).

The chosen access right policy is then enforced against the characteristics of the current access in access type match 135. As an example, write access rights are checked using the write signal 33 from the memory access bus 30. If the current access does not match the current access rights policy, and if the data region accessed signal 136 is asserted for this current access, then the trigger line 10 is asserted to indicate that the current access reflected by the memory access bus 30 violates the current access rights policy.

Figure 3C:
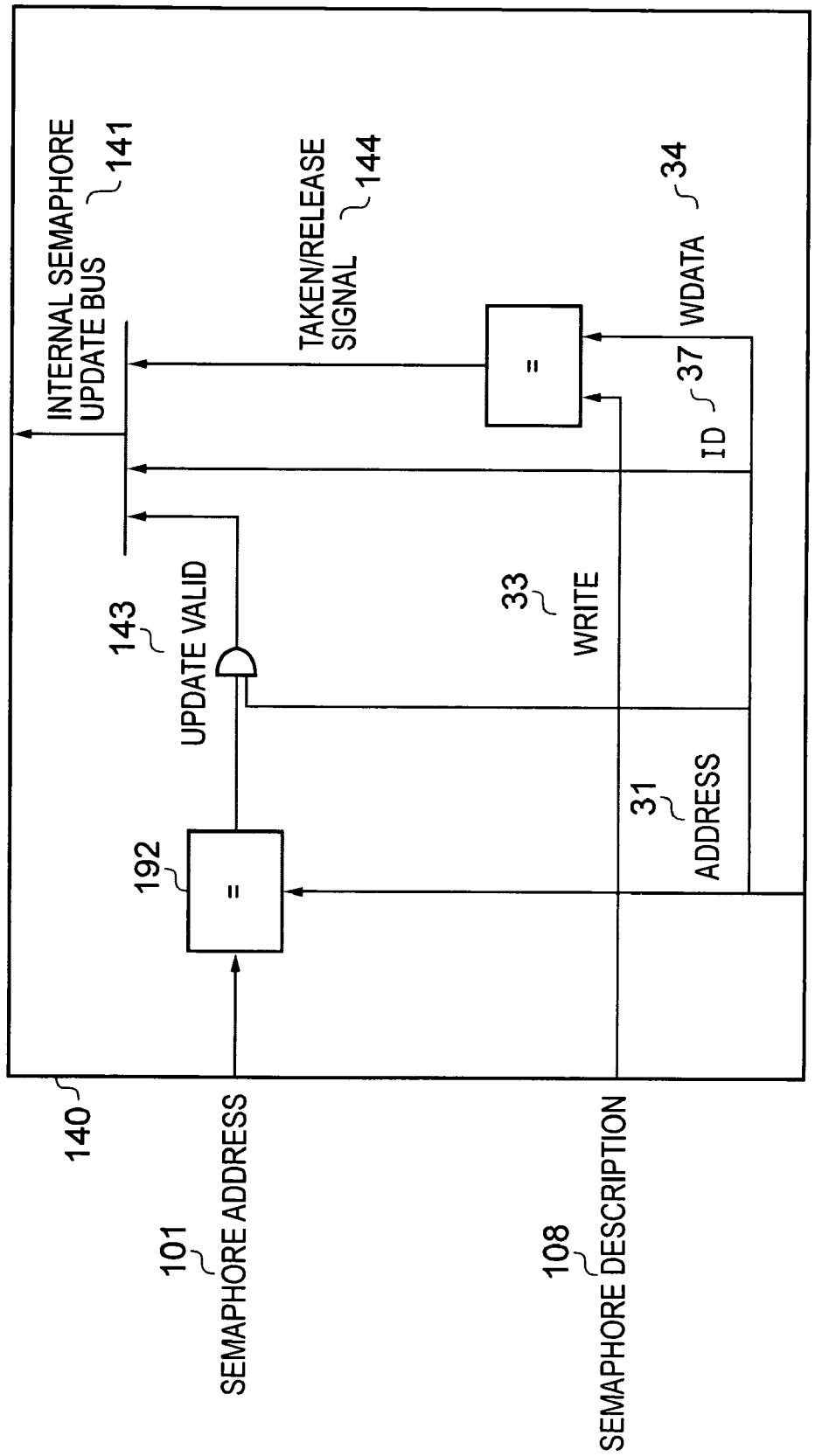
FIG. 3C is a block diagram of a semaphore watching unit, used to track changes to the state of the semaphore.

FIG. 3C illustrates the internal blocks of the semaphore watching unit 140 described in FIG. 3A. The simple embodiment described here shows that, on a new memory access made by the processing device, the semaphore address 101 value is compared to the address 31 of the current memory access, and if they match and the access is a write, as indicated by the write signal 33 of the memory access port 30, then the semaphore watching unit 140 indicates on the internal semaphore update bus 141 that a change to the semaphore is occurring. In this example embodiment, the value of the write data 34 of the current access is compared to the value of the semaphore description 108, to determine the new state of the semaphore. The TAKEN/RELEASE signal 144 is asserted accordingly.

The ID 37 of the memory access port 30 is used, in the case where the current write indicates that the semaphore is now taken, to update the SEMAPHORE OWNER ID 107 on FIG. 3A accordingly. In the present example embodiment, the internal semaphore update bus 141 provides in an update valid signal 143, an identification field and a TAKEN/RELEASE signal 144. (one skilled in the art will understand that the present techniques can use other protocols).

FIG. 4 is a flow diagram illustrating the tasks being performed when a new transfer request is made by the processing device. Though FIG. 4. illustrates two tasks performed in parallel, as is done in the example embodiment, one skilled in the art will understand that the present techniques are not limited to embodiments where these two tasks are performed simultaneously. For example, some embodiments could perform both comparisons serially, to reduce the amount of hardware needed for doing the comparisons.

On a new transfer request from the processing device, a first comparison 1000 is made to check if the current transfer request targets a memory region being watched at by the watch point unit. If so, the watch point unit further checks that the current access request complies with the current access rights policy 1002, 1004. This includes read and write checking, in the view of the current state of the semaphore and of the identification of the current process being executed by the processing device. One skilled in the art will note that the check of the access rights policy can be performed in parallel with the check of the access targeting or not the memory region watched at by the semaphore. These two steps are only described serially to ease the understanding of the operation, and do not represent a limitation to the scope of the present techniques.

If the access complies with the current access rights policies, the transfer is allowed to proceed without any intervention from the watch point unit. If it does not comply with the current access rights policies, the trigger line is asserted 1006. In the preferred embodiment, the trigger line will force the processing device to enter debug mode prior to completing the current memory access, to ensure that neither the memory nor the internal state of the processing devices gets corrupted by the prohibited memory access, though the present techniques are not limited to this behaviour.

In parallel, for the new transfer request from the processing device, the watch point unit further checks 1008, in the semaphore watching unit 140 described in FIG. 3A, if the access is a write access targeted at the memory location of the semaphore. If it is, based on the SEMAPHORE DESCRIPTION 108 described in FIG. 3A, the semaphore watching units decides 1010 the new state of the semaphore, and updates the SEMAPHORE STATE 106 described in FIG. 3A. If this state is one of the states that requires an owner of the semaphore to be identified, the semaphore watching unit extracts from the memory access bus 130 described in FIG. 3A the identification of the process currently being executed on the processing device, and uses this to assign a new value to the SEMAPHORE OWNER ID 107 which is described in FIG. 3A.

The new state and, if relevant, the new owner identification, are further sent to the watch point communication unit 150 described in FIG. 3A. This watch point communication unit 150 uses the inter watch point bus 120 as described for example on FIG. 2B to broadcast this change to other watch point units in the rest of the system. On reception of such a change request, the watch point communication unit 150 in the other watch point unit will modify their local values of the SEMAPHORE STATE 106 and of the SEMAPHORE OWNER ID 107 accordingly.

Figure 5:
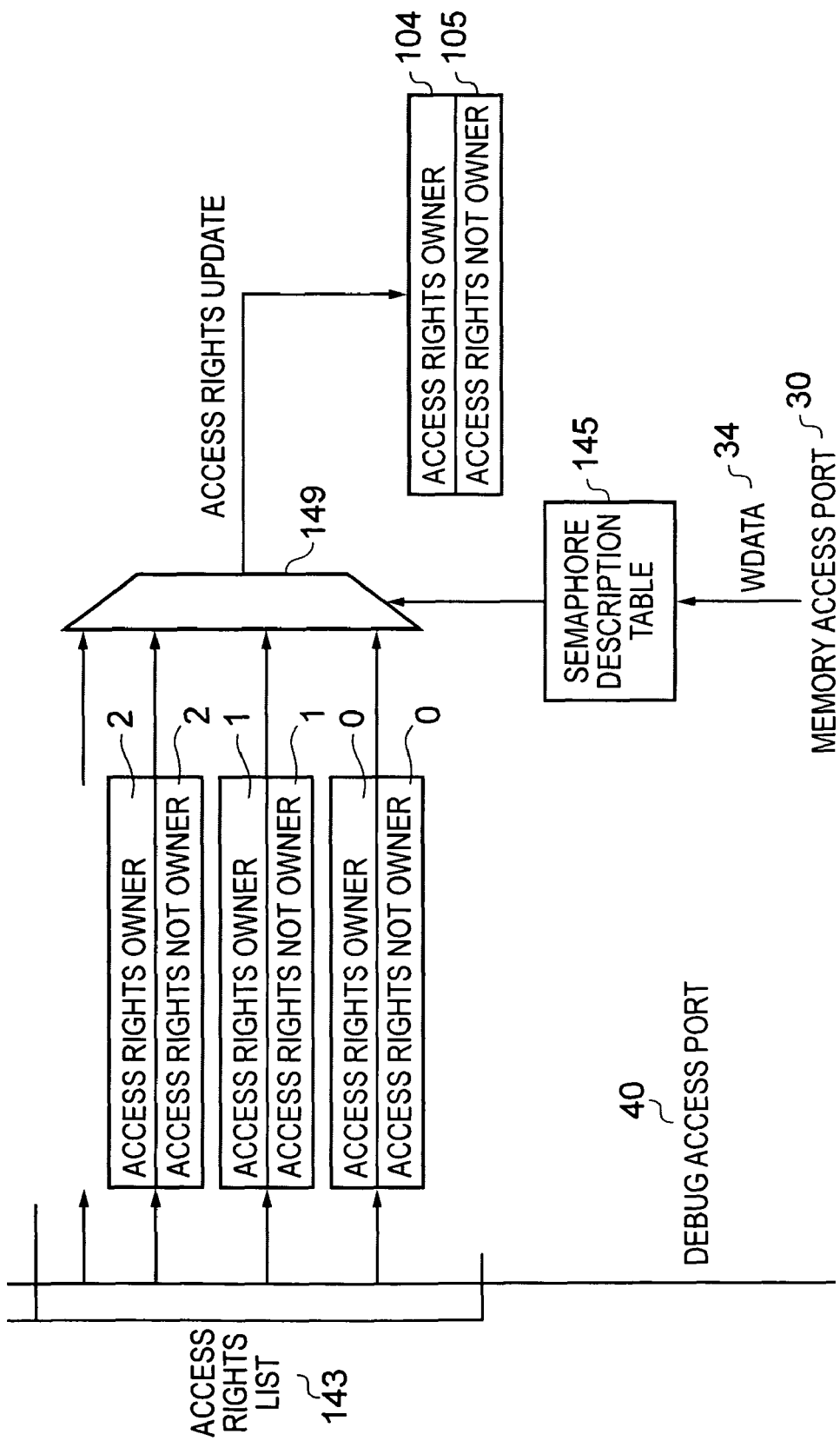
FIG. 5 is a block diagram showing an advanced semaphore watching unit where multiple access rights policies are to be enforced depending on the state of the semaphore.

FIG. 5 describes a scheme where the semaphore is of a more complex functionality. In this example embodiment, the semaphore provides a field used to provide a more fine grained control over the processing of the data set watched by the watch point unit and protected by the semaphore. Such a scheme can be used, for example, when a set of data undergoes multiple operations in a row. The semaphore can be used to reflect which of these steps have been performed, and which ones are still to be executed. As such, for each task, the access rights policies may differ one from another. For example, during the execution of a first task, where the data set is being produced, only the owner is allowed to write to the data area, and nobody, including the owner, is allowed to read from it. During a second task, the owner may get exclusive read and write rights, for sorting this data set. During a third task, everybody may be allowed to parse the data set, e.g. to search for a given token in this data set. This embodiment allows the access rights policies to be dynamically adjusted, reflecting the changes in the semaphore. To this end, a set of registers, representing the multiple access rights for owner and not owner, are provided. These registers are represented in FIG. 5 with the labels ACCESS RIGHTS OWNER and ACCESS RIGHTS NOT OWNER, with multiple different numbers differentiating them. These multiple registers can be accessed through the debug access port 140, and are set by the debugger to reflect the different states the semaphore can take. When the field representing the different states the semaphore can take gets updated by a write request, the data written to this field, and represented by the WDATA 34 on the memory access port 30, is checked through a semaphore description table 145, and used to choose which one should be applied between the multiple pair of access rights. A default set of access rights may be provided (not illustrated), to be used, for example, when the semaphore is released and there is not relevant owner information. Once the pair of access rights has been selected, the semaphore watching unit updates the local ACCESS RIGHTS OWNER 104 and ACCESS RIGHTS NOT OWNER 105 registers described in FIG. 3A. In addition to this, in a multi-processor environment, the watch point unit communication 150 is informed of this change so that the change can be broadcasted to the other watch point unit across the system.

Figure 6:
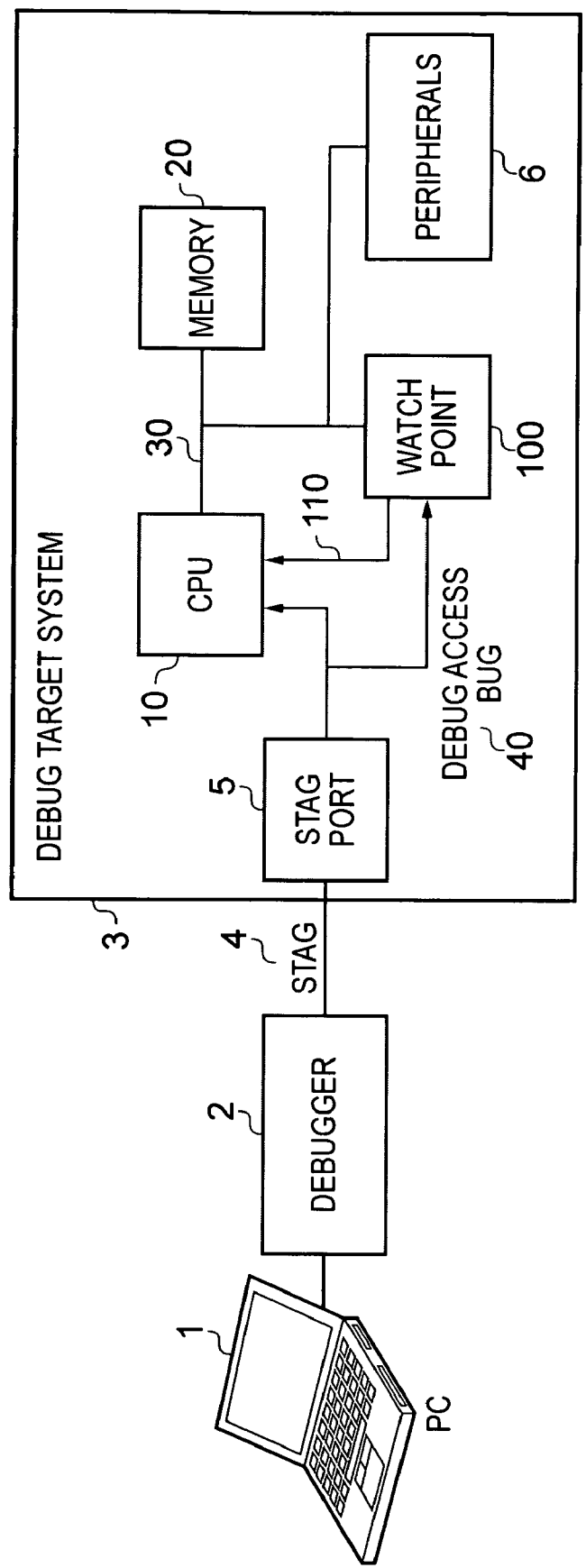
FIG. 6 is a block diagram showing a standard debugging system, including a host PC used to debug a program running on one processing device.

FIG. 6 schematically illustrates a system for use in performing diagnostic operations upon an apparatus for processing data. In this example, the system comprises three main parts namely the apparatus for processing data that is to be debugged 3, i.e. the debug target system, a debugger interface unit 2 and a general purpose computer I running computer software for controlling the debugger interface 2 and programming the watch point, break point and semaphore data within the debug target system 3.

The debug target system 3 can have the form illustrated in the preceding diagrams including the provision of a semaphore guarding an area of data together with a semaphore watching unit 140 which watches for changes in the semaphore itself. As previously described, data watch points and break points may be set up by programming break point registers and watch point registers. This programming is performed by a user employing software executing on the general purpose computer 1 to select values to be programmed into these registers. These values are then communicated to the debug target system 3 via the debugger interface and over a debug communication channel, such as one using a JTAG signal line and JTAG port within the debug target system 3. As well as programming watch points and break points in a way which will be familiar to those in this technical field, the software executing on the general purpose computer 1 additionally includes the capability to program the semaphore behaviour by programming the various registers 101-108 illustrated in FIG. 3A discussed above. Where the debug target system includes multiple processors with multiple watch point units 100, then the semaphore data in the registers 101-108 for each of these separate watch point units 100 may be separately processed and programmed to give the appropriate behaviour.

In addition to providing the new functionality of programming the data specifying the semaphore behaviour, the computer software executing on the general purpose computer 1 also provides the capability of reading the semaphore data from the registers 101-108 during debug operations. This can allow the person attempting to understand the behaviour of the debug target system 3 to analyse the semaphore state and other information at a particular point in the processing so as to better understand the system behaviour and/or identify and correct faulty behaviour.

We claim:

1. Apparatus for processing data comprising:
    data watch point circuitry responsive to a sequence of data access requests made to watched data to determine for a request of said sequence of requests whether said request correlates with at least one watch point condition and, if said request does correlate with at least one watch point condition, to trigger a match response; and
    watch point updating circuitry responsive to a write access to an access-control data item stored in a memory to determine whether said write access is indicative of a need to change said at least one watch point condition and, if said write access is indicative of a need to change said at least one watch point condition, to overwrite said at least one watch point condition with a modified set of at least one watch point condition.

2. Apparatus as claimed in claim 1, wherein said apparatus provides identification data of a sequence of instructions being processed, said watch point updating circuitry being responsive to a change in said identification data to overwrite a current set of at least one watch point condition of said watch point unit with a new set of at least one watch point condition selected among said plurality of sets of at least one watch point condition, said new set of at least one watch point condition being selected in dependence upon said identification data provided by said apparatus.

3. Apparatus as claimed in claim 1, wherein said watch point updating circuitry is responsive to a value being written by said write access, to select which one of a plurality of sets of at least one watch point condition to use to overwrite said at least one watch point condition.

4. Apparatus as claimed in claim 1, comprising a plurality of processors having respective data watch point circuitry and watch point updating circuitry, wherein, when watch point updating circuitry of one processor determines a need to change said at least one watch point condition, said watch point updating circuitry triggers said overwriting of said at least one watch point condition in at least one other processor of said plurality of processors.

5. Apparatus as claimed in claim 4, wherein said watch point updating circuitry trigger storing of identification data of said sequence of instruction making said write access in said plurality of processors.

6. Apparatus as claimed in claim 5, where said identification data differs for said sequence of instructions depending on which processor executed said sequence of instructions and said watch point updating circuitry of a processor translates said identification data to a form for local use by said processor.

7. Apparatus as claimed in claimed 4, wherein said plurality of processors are operated in a Symmetric Multi-Processing mode.

8. A method as claimed in claim 1, wherein said method is performed upon a plurality of processors and when watch point updating circuitry of one processor determines a need to change said at least one watch point condition, said watch point updating circuitry triggers said overwriting of said at least one watch point condition in at least one other processor of said plurality of processors.

9. A method as claimed in claim 8, wherein said watch point updating circuitry triggers storing of identification data of said sequence of instruction making said write access in said plurality of processors.

10. A method as claimed in claimed 8, wherein said plurality of processors are operated in a Symmetric Multi-Processing mode.

11. A method as claimed in claim 9, where said identification data differs for said sequence of instructions depending on which processor executed said sequence of instructions and said watch point updating circuitry of a processor translates said identification data to a form for local use by said processor.

12. A method of performing diagnostic operations upon an apparatus for processing data, said method comprising the steps of:
  in response to a sequence of data access requests made to watched data, determining for a request of said sequence of requests whether said request correlates with at least one watch point condition and, if said request does correlate with at least one watch point condition, triggering a match response; and
  in response to a write access to an access-control data item stored in a memory, determining whether said write access is indicative of a need to change said at least one watch point condition and, if said write access is indicative of a need to change said at least one watch point condition, overwriting said at least one watch point condition with a modified set of at least one watch point condition.

13. A method as claimed in claim 12, comprising provides identification data of a sequence of instructions being processed and, in response to a change in said identification data, overwriting a current set of at least one watch point condition of said watch point unit with a new set of at least one watch point condition selected among said a plurality of sets of at least one watch point condition, said new set of at least one watch point condition being selected in dependence upon said identification data.

14. A method as claimed in claim 12, comprising in response to a value being written by said write access, selecting which one of a plurality of sets of at least one watch point condition to use to overwrite said at least one watch point condition.

15. A computer program product comprising a computer program stored on a storage medium, said computer program controlling a computer to configure data watch point circuitry and watch point updating circuitry within an apparatus for processing data to perform a method as claimed in claim 12.

* * * * *